(12) United States Patent
Rodriguez

(10) Patent No.: US 11,873,733 B2
(45) Date of Patent: Jan. 16, 2024

(54) TURBINE BLADE IN GAS TURBINE ENGINE

(71) Applicant: Siemens Energy Global GmbH & Co. KG, Munich (DE)

(72) Inventor: Jose L. Rodriguez, Longwood, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/006,875

(22) PCT Filed: Aug. 24, 2020

(86) PCT No.: PCT/US2020/070448
§ 371 (c)(1),
(2) Date: Jan. 26, 2023

(87) PCT Pub. No.: WO2022/046146
PCT Pub. Date: Mar. 3, 2022

(65) Prior Publication Data
US 2023/0272719 A1    Aug. 31, 2023

(51) Int. Cl.
*F01D 5/18*    (2006.01)

(52) U.S. Cl.
CPC ............ *F01D 5/18* (2013.01); *F05D 2220/32* (2013.01); *F05D 2240/30* (2013.01); *F05D 2260/20* (2013.01)

(58) Field of Classification Search
CPC ........ F01D 5/18; F01D 5/187; F05D 2220/32; F05D 2220/30; F05D 2260/20; F05D 2260/22141
See application file for complete search history.

(56) References Cited

U.S. PATENT DOCUMENTS

| | | |
|---|---|---|
| 2006/0042255 A1 | 3/2006 | Bunker et al. |
| 2006/0051208 A1 | 3/2006 | Lee et al. |
| 2006/0239820 A1 | 10/2006 | Kizuka et al. |
| 2013/0236330 A1 | 9/2013 | Lee |
| 2014/0338866 A1 | 11/2014 | Lee |
| 2019/0093487 A1 | 3/2019 | Marsh et al. |

OTHER PUBLICATIONS

PCT International Search Report and Written Opinion of International Searching Authority dated Apr. 26, 2021 corresponding to PCT International Application No. PCT/US2020/070448 filed Aug. 24, 2020.

*Primary Examiner* — Courtney D Heinle
*Assistant Examiner* — Andrew Thanh Bui

(57) ABSTRACT

A turbine blade in a gas turbine engine includes an airfoil extending in a radial direction. The airfoil has an outer wall delimiting an airfoil interior. The outer wall includes a pressure sidewall and a suction sidewall joined at a leading edge and a trailing edge in a longitudinal direction. A turbulator is disposed in the airfoil interior. The turbulator includes a first row having at least two turbulator ribs spaced apart in the longitudinal direction. The turbulator includes a second row extending in the radial direction from the first row and having at least two turbulator ribs spaced apart in the longitudinal direction.

18 Claims, 6 Drawing Sheets

TURBINE BLADE IN GAS TURBINE ENGINE

BACKGROUND

An industrial gas turbine engine typically includes a compressor section, a turbine section, and a combustion section disposed therebetween. The compressor section includes multiple stages of rotating compressor blades and stationary compressor vanes. The combustion section typically includes a plurality of combustors.

The turbine section includes multiple stages of rotating turbine blades and stationary turbine vanes. Turbine blades and vanes often operate in a high temperature environment and are internally cooled.

BRIEF SUMMARY

A turbine blade in a gas turbine engine is presented. The turbine blade includes a root, a platform coupled to the root, an airfoil extending from the platform to a tip surface in a radial direction, the airfoil comprising an outer wall delimiting an airfoil interior, the outer wall comprising a pressure sidewall and a suction sidewall joined at a leading edge and a trailing edge in a longitudinal direction, a first partition wall positioned in the airfoil interior and coupled to the pressure sidewall and the suction sidewall, a second partition wall positioned in the airfoil interior and coupled to the pressure sidewall and the suction sidewall, the second partition wall spaced apart from the first partition wall, a cooling cavity being defined by the pressure sidewall, the suction sidewall, the first partition wall, and the second partition wall, a flow blocking body disposed in the cooling cavity, a first strut coupling the flow blocking body to the pressure sidewall, a second strut coupling the flow blocking body to the suction sidewall, a cooling channel being defined by the pressure sidewall, the suction sidewall, the first partition wall, the flow blocking body, the first strut, and the second strut, and a turbulator disposed in the cooling channel, the turbulator comprising a first row including at least two turbulator ribs spaced apart in the longitudinal direction, the turbulator comprising a second row extending in the radial direction from the first row and including at least two turbulator ribs spaced apart in the longitudinal direction.

A turbine blade in a gas turbine engine is presented. The turbine blade includes a root, a platform coupled to the root, an airfoil extending from the platform to a tip surface in a radial direction, the airfoil comprising an outer wall delimiting an airfoil interior, the outer wall comprising a pressure sidewall and a suction sidewall joined at a leading edge and a trailing edge in a longitudinal direction, a first partition wall positioned in the airfoil interior and coupled to the pressure sidewall and the suction sidewall, a second partition wall positioned in the airfoil interior and coupled to the pressure sidewall and the suction sidewall, the second partition wall spaced apart from the first partition wall, a cooling cavity being defined by the pressure sidewall, the suction sidewall, the first partition wall, and the second partition wall, and a turbulator disposed in the cooling cavity, the turbulator comprising a first row including at least two turbulator ribs spaced apart in the longitudinal direction, the turbulator comprising a second row extending in the radial direction from the first row and including at least two turbulator ribs spaced apart in the longitudinal direction.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
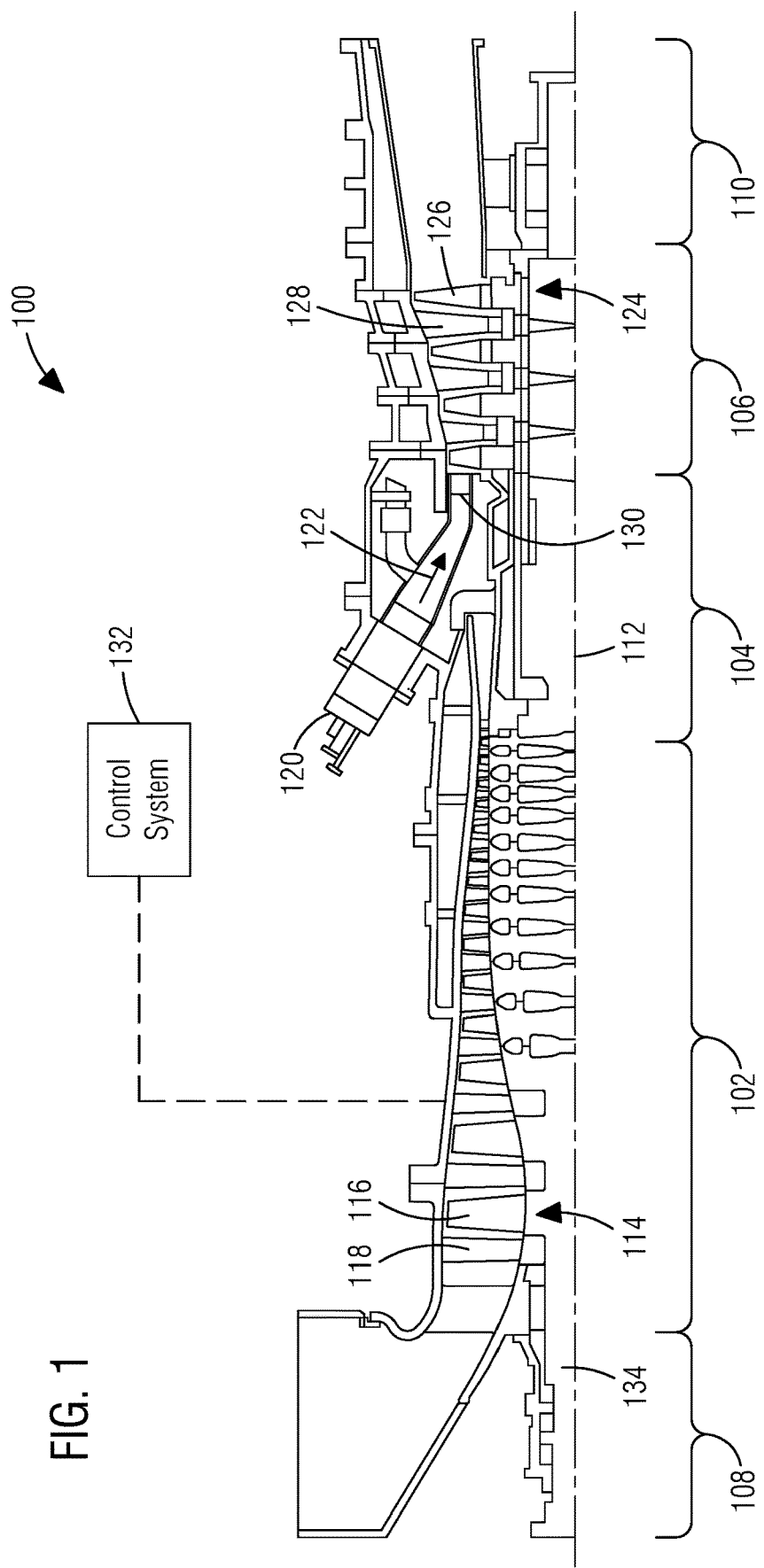
FIG. 1 is a longitudinal cross-sectional view of a gas turbine engine 100 taken along a plane that contains a longitudinal axis or central axis.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates an example of a gas turbine engine 100 including a compressor section 102, a combustion section 104, and a turbine section 106 arranged along a central axis 112. The compressor section 102 includes a plurality of compressor stages 114 with each compressor stage 114 including a set of rotating blades 116 and a set of stationary vanes 118 or adjustable guide vanes. A rotor 134 supports the rotating blades 116 for rotation about the central axis 112 during operation. In some constructions, a single one-piece rotor 134 extends the length of the gas turbine engine 100 and is supported for rotation by a bearing at either end. In other constructions, the rotor 134 is assembled from several separate spools that are attached to one another or may include multiple disk sections that are attached via a bolt or plurality of bolts.

The compressor section 102 is in fluid communication with an inlet section 108 to allow the gas turbine engine 100 to draw atmospheric air into the compressor section 102. During operation of the gas turbine engine 100, the compressor section 102 draws in atmospheric air and compresses that air for delivery to the combustion section 104. The illustrated compressor section 102 is an example of one compressor section 102 with other arrangements and designs being possible.

In the illustrated construction, the combustion section 104 includes a plurality of separate combustors 120 that each operate to mix a flow of fuel with the compressed air from the compressor section 102 and to combust that air-fuel mixture to produce a flow of high temperature, high pressure combustion gases or exhaust gas 122. Of course, many other arrangements of the combustion section 104 are possible.

The turbine section 106 includes a plurality of turbine stages 124 with each turbine stage 124 including a number of rotating turbine blades 126 and a number of stationary turbine vanes 128. The turbine stages 124 are arranged to receive the exhaust gas 122 from the combustion section 104 at a turbine inlet 130 and expand that gas to convert thermal and pressure energy into rotating or mechanical work. The turbine section 106 is connected to the compressor section 102 to drive the compressor section 102. For gas turbine engines 100 used for power generation or as prime movers, the turbine section 106 is also connected to a generator, pump, or other device to be driven. As with the compressor section 102, other designs and arrangements of the turbine section 106 are possible.

An exhaust portion 110 is positioned downstream of the turbine section 106 and is arranged to receive the expanded flow of exhaust gas 122 from the final turbine stage 124 in the turbine section 106. The exhaust portion 110 is arranged to efficiently direct the exhaust gas 122 away from the turbine section 106 to assure efficient operation of the turbine section 106. Many variations and design differences are possible in the exhaust portion 110. As such, the illustrated exhaust portion 110 is but one example of those variations.

A control system 132 is coupled to the gas turbine engine 100 and operates to monitor various operating parameters and to control various operations of the gas turbine engine 100. In preferred constructions the control system 132 is typically micro-processor based and includes memory devices and data storage devices for collecting, analyzing, and storing data. In addition, the control system 132 provides output data to various devices including monitors, printers, indicators, and the like that allow users to interface with the control system 132 to provide inputs or adjustments. In the example of a power generation system, a user may input a power output set point and the control system 132 may adjust the various control inputs to achieve that power output in an efficient manner.

The control system 132 can control various operating parameters including, but not limited to variable inlet guide vane positions, fuel flow rates and pressures, engine speed, valve positions, generator load, and generator excitation. Of course, other applications may have fewer or more controllable devices. The control system 132 also monitors various parameters to assure that the gas turbine engine 100 is operating properly. Some parameters that are monitored may include inlet air temperature, compressor outlet temperature and pressure, combustor outlet temperature, fuel flow rate, generator power output, bearing temperature, and the like. Many of these measurements are displayed for the user and are logged for later review should such a review be necessary.

Figure 2:
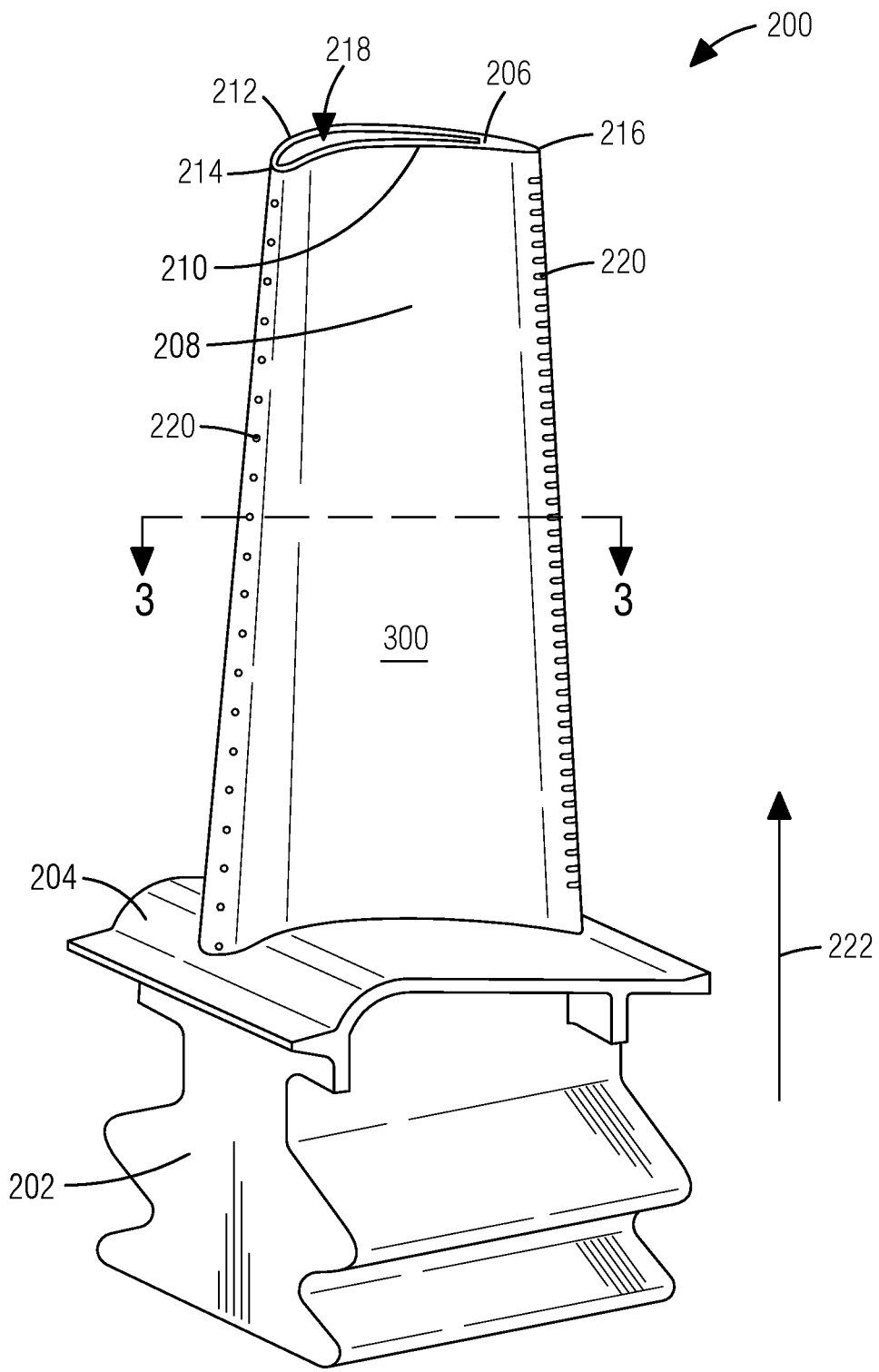
FIG. 2 is a perspective view of a turbine blade.

FIG. 2 is a perspective view of a turbine blade 200 in a gas turbine engine 100. The turbine blade 200 includes a root 202, a platform 204, and an airfoil 300. The platform 204 is coupled to the root 202. The airfoil 300 is coupled to the platform 204. In some constructions, the root 202, the platform 204, and the airfoil 300 are formed as a single unitary component that is cast, forged, machined, additively manufactured, or made using any combinations thereof or other suitable manufacturing techniques.

The root 202 couples the turbine blade 200 to a turbine disc, rotor or other feature (not shown). The airfoil 300 extends from the platform 204 along a radial direction 222 of the gas turbine engine 100 (i.e., radially with respect to the central axis 112) to a tip surface 206. The airfoil 300 has an outer wall 208 forming a concaved shaped pressure sidewall 210 and a convex shaped suction sidewall 212. The pressure sidewall 210 and suction sidewall 212 meet at a leading edge 214 and a trailing edge 216. The outer wall 208 delimits an airfoil interior 218 between the pressure sidewall 210 and suction sidewall 212.

One or more exhaust orifices 220 are disposed along the leading edge 214 and the trailing edge 216 and spaced apart from one another in the radial direction 222. In other constructions, the exhaust orifices 220 may also be provided at other locations of the turbine blade 200, such as any locations along the pressure sidewall 210 or along the suction sidewall 212 between the leading edge 214 and the trailing edge 216.

Figure 3:
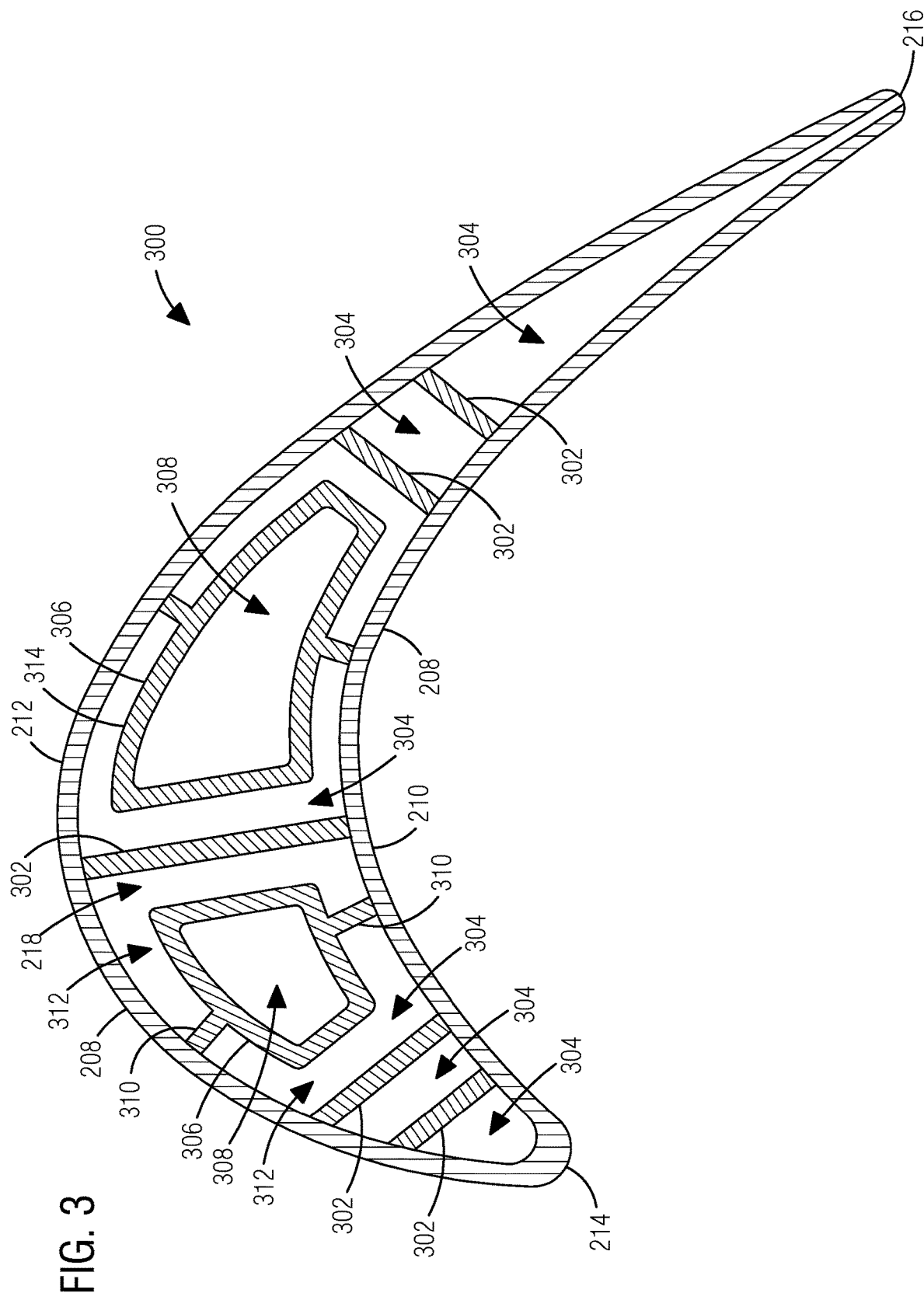
FIG. 3 is a cross section view of the turbine blade along section line 3-3 of FIG. 2.

FIG. 3 is a cross section view of the airfoil 300 along section line 3-3 of FIG. 2. One or more partition walls 302 are positioned within the airfoil interior 218 and coupled to the pressure sidewall 210 and the suction sidewall 212. The partition walls 302 are spaced apart from one another between the leading edge 214 and the trailing edge 216. One or more cooling cavities 304 are defined between the pressure sidewall 210, the suction sidewall 212, and a pair of adjacent partition walls 302. The cooling cavities 304 extend in the radial direction 222, as indicated in FIG. 2. In the illustrated construction, five partition walls 302 are positioned within the airfoil interior 218 to divide the airfoil interior 218 into six distinct cooling cavities 304. Other constructions may include fewer or more partition walls 302.

A flow blocking body 306 is disposed in at least one cooling cavity 304. The flow blocking body 306 includes a perimeter wall 314 that encloses a hollow flow block body interior 308. The flow blocking body 306 blocks coolant 506 (shown in FIG. 5) entering the flow block body interior 308 and thus directs the coolant 506 near the outer wall 208 to improve convective heat transfer cooling along the outer wall 208. A pair of struts 310 couple the flow blocking body 306 to the pressure sidewall 210 and the suction sidewall 212, respectively. The flow blocking body 306 and the pair of struts 310 split the cooling cavity 304 into two adjacent cooling channels 312. The two adjacent cooling channels 312 are fluidically connected and conduct the coolant 506 in opposite radial directions. One cooling channel 312 of the adjacent cooling channels 312 conducts the coolant 506 from the root 202 to the tip surface 206 forming an up cooling channel 312. The other cooling channel 312 of the adjacent cooling channels 312 conducts the coolant 506 from the tip surface 206 to the root 202 forming a down cooling channel 312. In other constructions, coolant flows in one direction through both cooling channels 312 and the channels 312 may or may not be fluidly connected to one another.

A second flow blocking body 306 is disposed in a second cooling cavity 304 that splits the second cooling cavity 304 into two adjacent up and down cooling channels 312. It is possible that a further flow blocking body 306 may be disposed in a further cooling cavity 304 forming a further pair of adjacent up and down cooling channels 312. The plurality of up and down cooling channels 312 are fluidically connected in series forming a serpentine cooling channel in the airfoil interior 218. In other constructions, coolant flows in one direction through both cooling channels 312 and the channels 312 may or may not be fluidly connected to one another.

As illustrated in FIG. 3, each of the first and second flow blocking bodies 306 has a hollow flow block body interior 308. However, it is also possible that at least one of the first and second flow blocking bodies 306 has a solid flow block body interior 308. The flow blocking bodies 306 may have various geometries.

Figure 4:
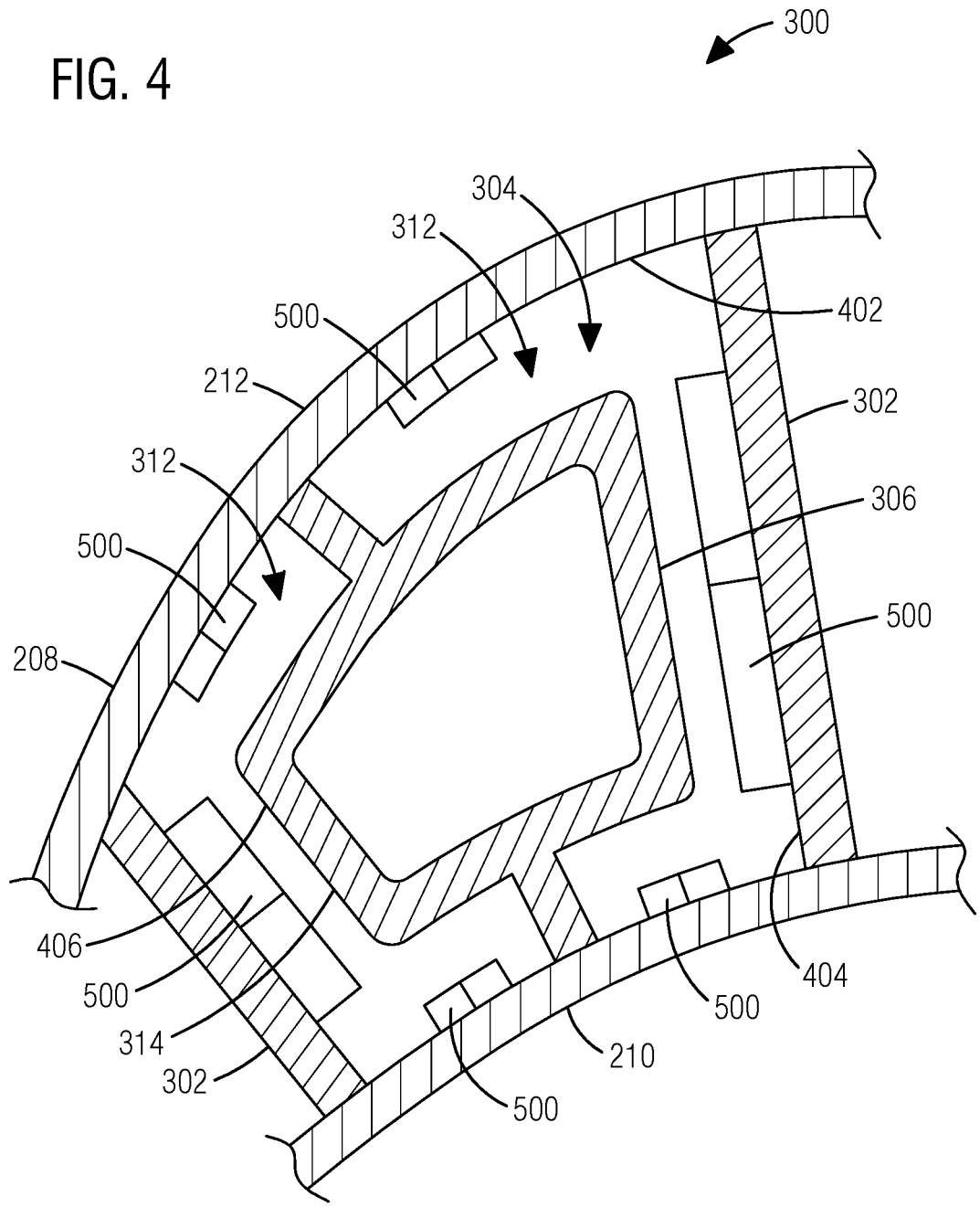
FIG. 4 is an enlarged view of a portion of FIG. 3.

FIG. 4 is an enlarged view of a portion of FIG. 3 showing a cooling cavity 304 having two adjacent up and down cooling channels 312. At least one turbulator 500 is disposed in one cooling channel 312. The turbulator 500 may be disposed on an inner surface 402 of the outer wall 208 at the pressure sidewall 210. The turbulator 500 may be disposed on an inner surface 402 of the outer wall 208 at the suction sidewall 212. The turbulator 500 may be disposed on a surface 404 of the partition wall 302 facing to the cooling channel 312. It is also possible that the turbulator 500 may be disposed on a surface 406 of the perimeter wall 314 of the flow blocking body 306 facing to the cooling channel 312.

As shown in FIG. 4, three turbulators 500 are disposed in the cooling channel 312. In other constructions, it is possible that any number of turbulators 500 may be disposed in the cooling channel 312.

Figure 5:
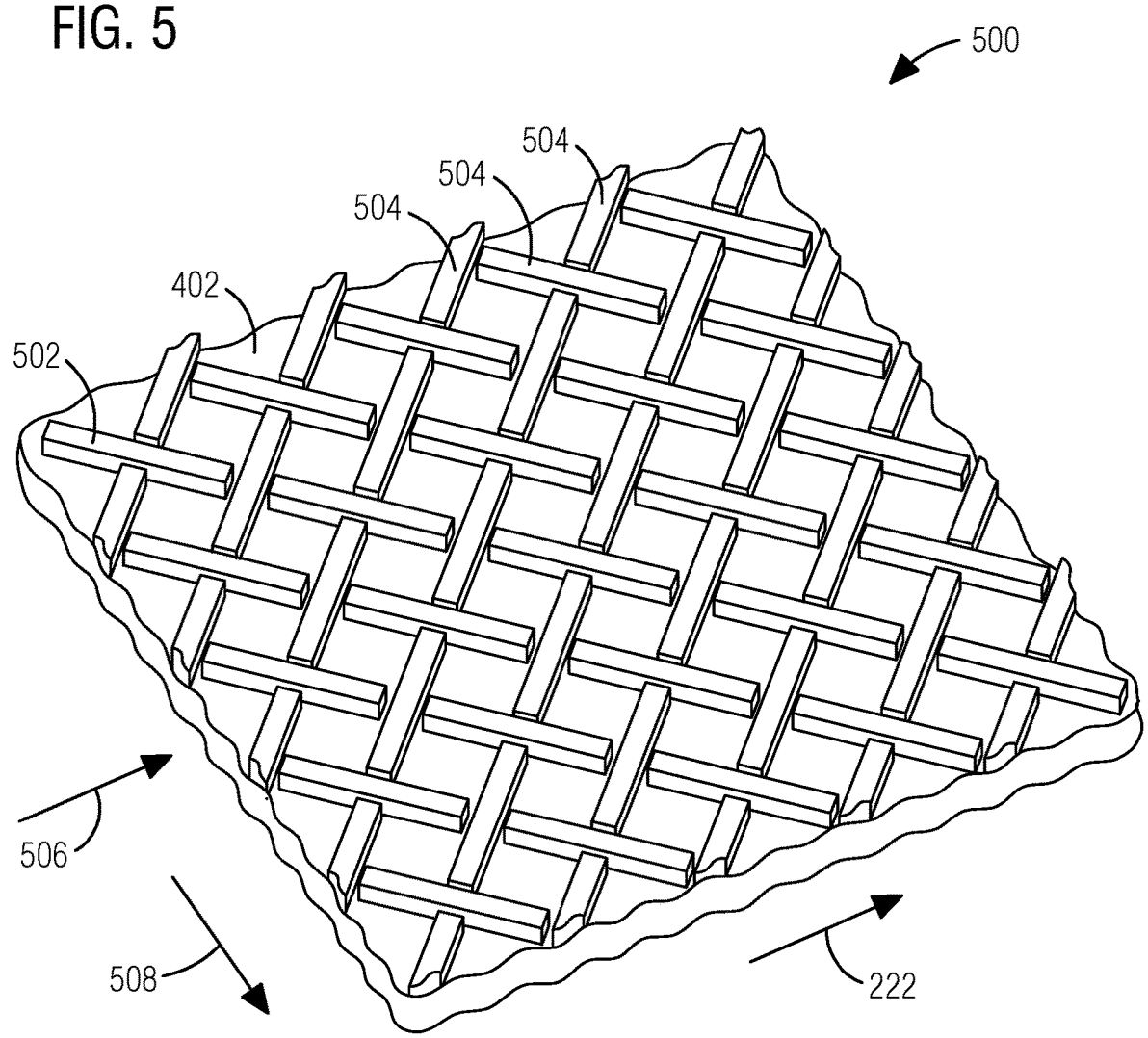
FIG. 5 is a perspective view of a turbulator.

FIG. 5 is a perspective view of a turbulator 500. The turbulator 500 includes more than one turbulator ribs 502 arranged on the inner surface 402. The turbulator ribs 502 are arranged in multiple rows 504. The rows 504 extend in the radial direction 222. Each row 504 includes at least two turbulator ribs 502 extending in a longitudinal direction 508 and spaced apart from each other. Coolant 506 transverses the turbulator ribs 502 in a general radial direction 222.

As shown in FIG. 5, each turbulator rib 502 includes a general rectangular shaped beam extending from the inner surface 402 to the cooling channel 312. However, the turbulator rib 502 may have various geometries. For example, the turbulator rib 502 may have a triangular prism shape, or a wedged shape, or a cylindrical shape, or any suitable shapes, etc. It is also possible different shaped turbulator ribs 502 may be arranged in one turbulator 500.

A dimension of the turbulator rib 502 is selected to meet a design requirement of the gas turbine engine 100. For example, a height of the turbulator rib 502 extending out from the inner surface 402 may be 1 mm, 2 mm, 3 mm, or any suitable size, etc. A width of the turbulator rib 502 may be the same as the height of the turbulator rib 502. However, it is also possible that the width of the turbulator rib 502 may be different from the height of the turbulator rib 502. A length of the turbulator rib 502 may be 24 mm, 26 mm, 27 mm, or any suitable size, etc. The turbulator ribs 502 may have the same dimension. It is also possible that the turbulator ribs 502 may have different dimensions.

FIG. 5 shows that the turbulator 500 is disposed on the inner surface 402 of the outer wall 208. It is possible that the turbulator 500 may be disposed on the surface 404 of the partition wall 302 facing to the cooling channel 312. It is also possible that the turbulator 500 may also be disposed on surface 406 of the perimeter wall 314 of the flow blocking body 306 facing to the cooling channel 312.

Figure 6:
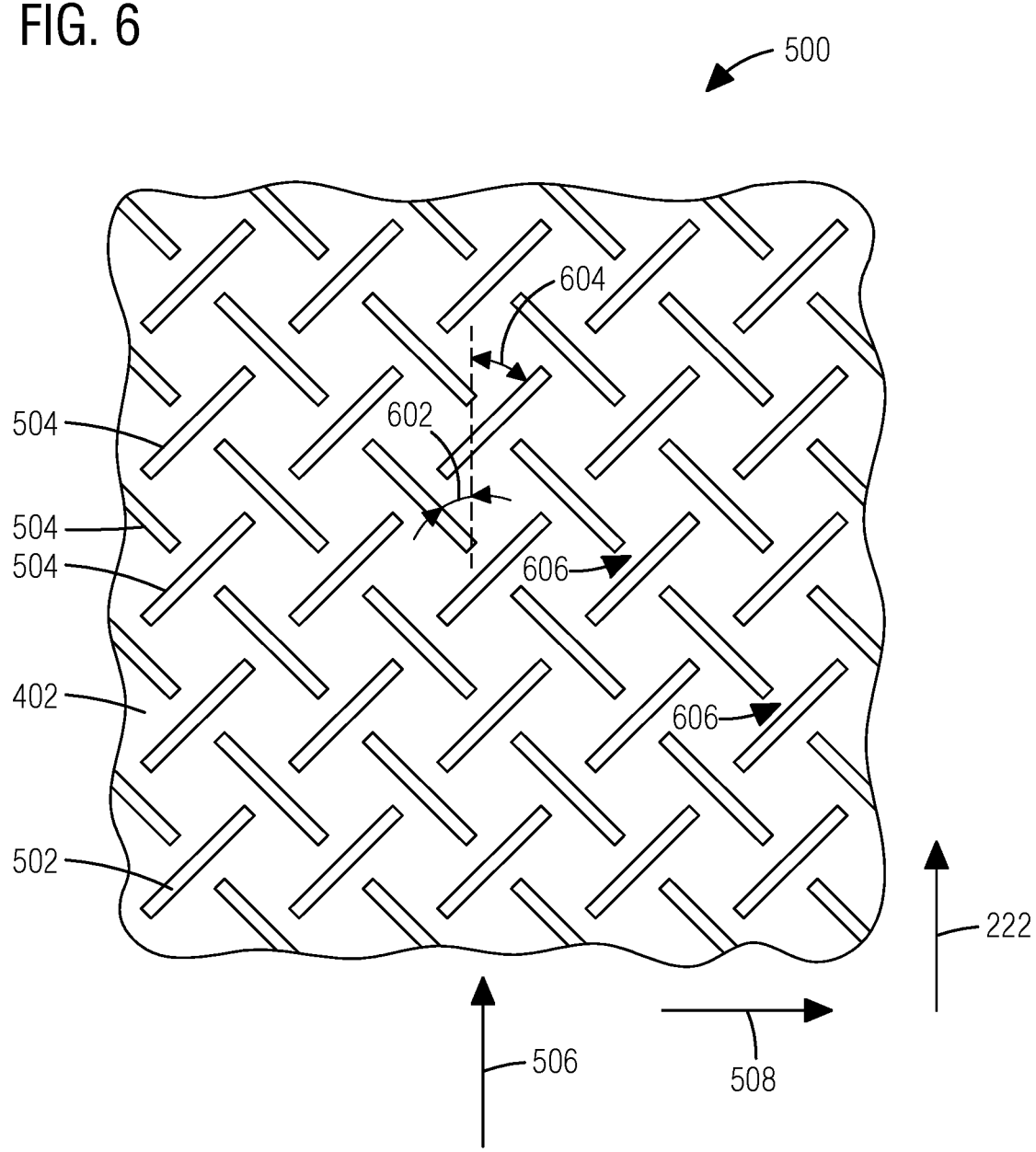
FIG. 6 is a front view of the turbulator in FIG. 5.

FIG. 6 is a front view of the turbulator 500 in FIG. 5. The turbulator ribs 502 of one row 504 are oriented at a first angle 602 with respect to a flow direction of the coolant 506. The turbulator ribs 502 of an adjacent row 504 are oriented at a second angle 604 with respect to the flow direction of the coolant 506. An angle between the turbulator ribs 502 of one row 504 and the turbulator ribs 502 of the adjacent row 504 is the sum of the first angle 602 and the second angle 604. The first angle 602 is an acute angle. The second angle 604 is also an acute angle. The first angle 602 may be equal to the second angle 604. It is possible that the first angle 602 may be different from the second angle 604. The angle between the turbulator ribs 502 of one row 504 and the turbulator ribs 502 of the adjacent row 504 is between 0 and 180 degrees. In the illustrated construction, the angle between the turbulator ribs 502 of one row 504 and the turbulator ribs 502 of the adjacent row 504 is 90 degrees.

The turbulator ribs 502 of a single row 504 are oriented parallel to each other. The turbulator ribs 502 of one row 504 are oriented perpendicular to the turbulator ribs 502 of an adjacent row 504. It is possible that the turbulator ribs 502 of one row 504 are oriented oblique to the turbulator ribs 502 of an adjacent row 504.

The turbulator ribs 502 of every other row 504 are oriented parallel to each other. It is possible that the turbulator ribs 502 of every other row 504 are oriented not parallel to each other.

The turbulator ribs 502 of adjacent rows 504 are offset in the longitudinal direction 508. The turbulator ribs 502 of every other row 504 are aligned in the longitudinal direction 508.

The turbulator ribs 502 of adjacent rows 504 are spaced apart from each other with a gap 606. A dimension of the gap 606 is selected to meet the design requirement of the gas turbine engine 100. For example, the gap 606 may be 2 mm, 5 mm, 10 mm, or any suitable size, etc.

The turbulator ribs 502 of adjacent rows 504 bisect each other. It is possible that the turbulator ribs 502 of one row 504 are offset to the centers of the turbulator ribs 502 of an adjacent row 504.

In operation, referring to FIG. 2, the coolant 506 is fed from the compressor section 102 and enters the plurality of cooling cavities 304 through the root 202 for cooling the turbine blade 200. The coolant 506 flows through the plurality of cooling cavities 304 and exits the turbine blade 200 through the plurality of exhaust orifices 220. The coolant 506 exiting the plurality of exhaust orifices 220 provides a film cooling along the leading edge 214, the trailing edge 216, or any other locations along the pressure sidewall 210 or along the suction sidewall 212 between the leading edge 214 and the trailing edge 216 where the exhaust orifice 220 may be provided.

The coolant 506 also provides convective heat transfer to the turbine blade 200. The coolant 506 transverses the turbulator ribs 502 in the cooling channel 312 in one direction arranged in one row 504 and in the other direction arranged in an adjacent row 504. Such an arrangement of the turbulator ribs 502 changes a local flow direction of the coolant 506 to increase the convective heat transfer on the surfaces enclosing the cooling channel 312 by increasing both turbulence in the cooling flow and surface area on the surface being cooled. The proposed turbulator 500 provides a general uniform cooling and increases cooling efficiency in the turbine blade 200 of the gas turbine engine 100.

While the detailed description provided uses a rotating turbine blade 200 as the example, the invention described is equally applicable to a stationary vane 118 and other high temperature components.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A turbine blade in a gas turbine engine, the turbine blade comprising: a root; a platform coupled to the root; an airfoil extending from the platform to a tip surface in a radial direction, the airfoil comprising an outer wall delimiting an airfoil interior, the outer wall comprising a pressure sidewall and a suction sidewall joined at a leading edge and a trailing edge in a longitudinal direction; a first partition wall positioned in the airfoil interior and coupled to the pressure sidewall and the suction sidewall; a second partition wall positioned in the airfoil interior and coupled to the pressure sidewall and the suction sidewall, the second partition wall spaced apart from the first partition wall, a cooling cavity being defined by the pressure sidewall, the suction sidewall, the first partition wall, and the second partition wall; a flow blocking body disposed in the cooling cavity; a first strut coupling the flow blocking body to the pressure sidewall; a second strut coupling the flow blocking body to the suction sidewall, a cooling channel being defined by the pressure sidewall, the suction sidewall, the first partition wall, the flow blocking body, the first strut, and the second strut; and a turbulator disposed in the cooling channel, the turbulator comprising a first row including at least two turbulator ribs spaced apart in the longitudinal direction, the turbulator comprising a second row extending in the radial direction from the first row and including at least two turbulator ribs spaced apart in the longitudinal direction;

wherein the at least two turbulator ribs of the first row bisect to the at least two turbulator ribs of the second row.

2. The turbine blade of claim 1, wherein the at least two turbulator ribs of the first row are oriented at a first angle with respect to a flow direction of a coolant, wherein the at least two turbulator ribs of the second row are oriented at a second angle with respect to the flow direction of the coolant, and wherein an angle between the at least two turbulator ribs of the first row and the at least two turbulator ribs of the second row is a sum of the first angle and the second angle.

3. The turbine blade of claim 2, wherein the angle between the at least two turbulator ribs of the first row and the two turbulator ribs of the second row is between 0 and 180 degrees.

4. The turbine blade of claim 3, wherein the angle between the at least two turbulator ribs of the first row and the two turbulator ribs of the second row is perpendicular.

5. The turbine blade of claim 1, wherein the first row and the second row are part of a plurality of rows, and wherein the at least two turbulator ribs of every other row are oriented parallel to each other.

6. The turbine blade of claim 1, wherein the first row and the second row are part of a plurality of rows, and wherein the at least two turbulator ribs of every other row are aligned in the longitudinal direction.

7. The turbine blade of claim 1, wherein the at least two turbulator ribs in the first rows are offset to the at least two turbulator ribs in the second row in the longitudinal direction.

8. The turbine blade of claim 1, wherein the at least two turbulator ribs of the first row are spaced apart from the at least two turbulator ribs of the second row in the radial direction.

9. The turbine blade of claim 1, wherein the turbulator is disposed on an inner surface of the outer wall, a surface of the first partition wall facing to the cooling channel, a surface of the flow blocking body facing to the cooling channel, and combinations thereof.

10. A turbine blade in a gas turbine engine, the turbine blade comprising: a root; a platform coupled to the root; an airfoil extending from the platform to a tip surface in a radial direction, the airfoil comprising an outer wall delimiting an airfoil interior, the outer wall comprising a pressure sidewall and a suction sidewall joined at a leading edge and a trailing edge in a longitudinal direction; a first partition wall positioned in the airfoil interior and coupled to the pressure sidewall and the suction sidewall; a second partition wall positioned in the airfoil interior and coupled to the pressure sidewall and the suction sidewall, the second partition wall spaced apart from the first partition wall, a cooling cavity being defined by the pressure sidewall, the suction sidewall, the first partition wall, and the second partition wall; and a turbulator disposed in the cooling cavity, the turbulator comprising a first row including at least two turbulator ribs spaced apart in the longitudinal direction, the turbulator comprising a second row extending in the radial direction from the first row and including at least two turbulator ribs spaced apart in the longitudinal direction;

wherein the at least two turbulator ribs of the first row bisect to the at least two turbulator ribs of the second row.

11. The turbine blade of claim 10, wherein the at least two turbulator ribs of the first row are oriented at a first angle with respect to a flow direction of a coolant, wherein the at least two turbulator ribs of the second row are oriented at a second angle with respect to the flow direction of the coolant, and wherein an angle between the at least two turbulator ribs of the first row and the two turbulator ribs of the second row is a sum of the first angle and the second angle.

12. The turbine blade of claim 11, wherein the angle between the at least two turbulator ribs of the first row and the two turbulator ribs of the second row is between 0 and 180 degrees.

13. The turbine blade of claim 12, wherein the angle between the at least two turbulator ribs of the first row and the two turbulator ribs of the second row is perpendicular.

14. The turbine blade of claim 10, wherein the first row and the second row are part of a plurality of rows, and wherein the at least two turbulator ribs of every other row are oriented parallel to each other.

15. The turbine blade of claim 10, wherein the first row and the second row are part of a plurality of rows, and wherein the at least two turbulator ribs of every other row are aligned in the longitudinal direction.

16. The turbine blade of claim 10, wherein the at least two turbulator ribs in the first rows are offset to the at least two turbulator ribs of the second row in the longitudinal direction.

17. The turbine blade of claim 10, wherein the at least two turbulator ribs of the first row are spaced apart from the at least two turbulator ribs of the second row in the radial direction.

18. The turbine blade of claim 10, wherein the turbulator is disposed on an inner surface of the outer wall, a surface of the first partition wall facing to the cooling cavity, a surface of the second partition wall facing to the cooling cavity, and combinations thereof.

* * * * *